March 7, 1933. E. J. MADDEN 1,900,512
BRAKE CABLE TUBE
Filed March 14, 1929
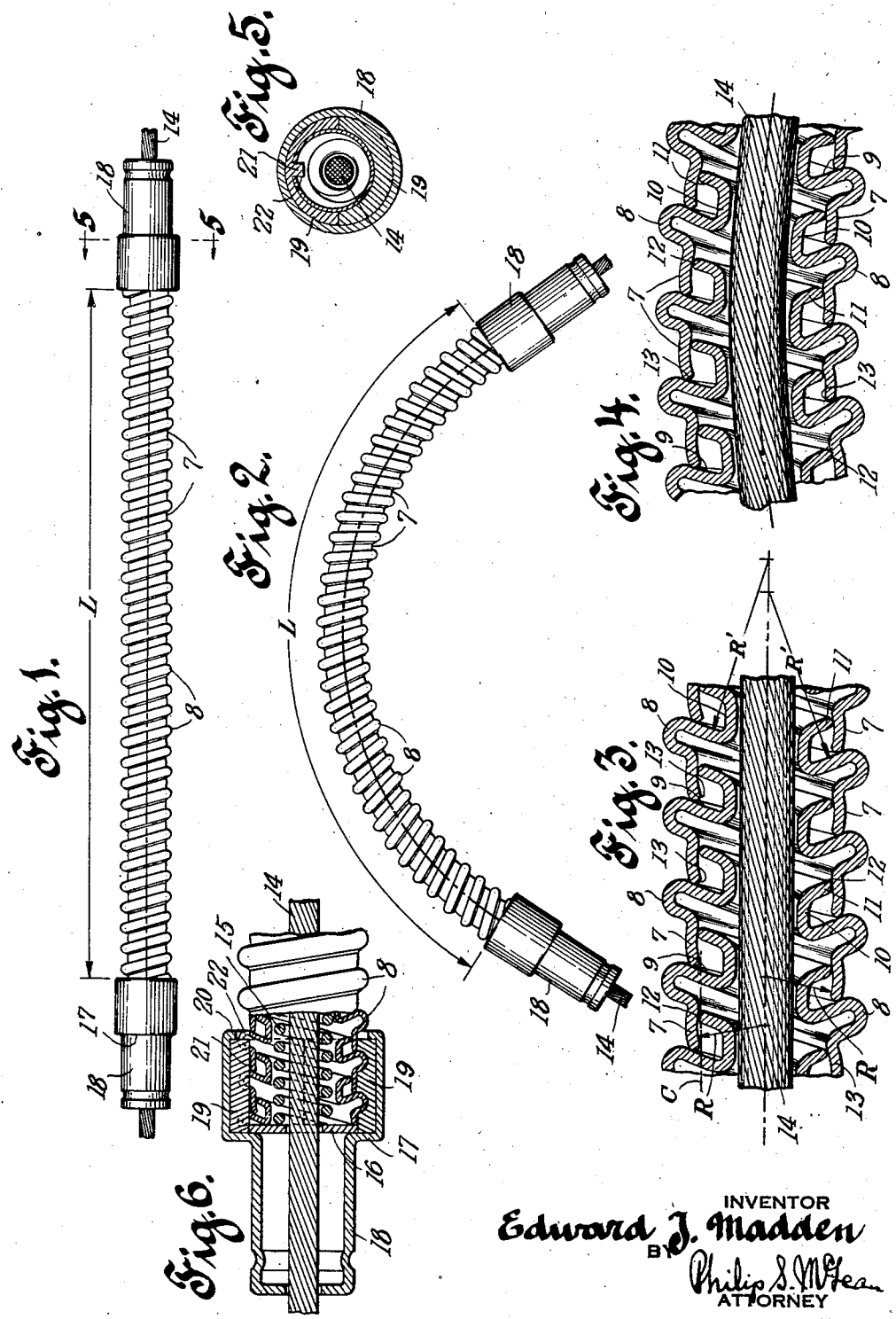
INVENTOR
Edward J. Madden
BY
Philip S. McGean
ATTORNEY Patented Mar. 7, 1933

1,900,512

UNITED STATES PATENT OFFICE

EDWARD J. MADDEN, OF BRIDGEPORT, CONNECTICUT

BRAKE CABLE TUBE

Application filed March 14, 1929. Serial No. 346,910.

This invention relates to the tubing used for mechanical four wheel brakes. A common fault with such tubing heretofore has been that with the flexing of the tubing on the turning of the steering wheels, the effective inside length of the tubing will vary, producing undesired and some times dangerous changes in the braking effects.

The objects of this invention are to overcome this fault and to provide in practical commercial form a brake tube of simple substantial construction having a substantially non-varying inside effective length.

These objects are attained by a novel construction, arrangement and relation of parts as hereinafter described and as illustrated by way of example in the accompanying drawing.

In the drawing, certain practical commercial embodiments of the invention are disclosed, but it will be apparent from the following specification and from the broad scope of the claims that the invention is not limited to the particular forms or embodiments shown.

Figs. 1 and 2 are side views showing the brake tube in straight and bent relations and indicating particularly that the inside effective length "L" remains for practical purposes the same in both circumstances; Figs. 3 and 4 are broken sectional enlarged views showing in detail the construction of the tubing and the compensating method of interlocking the convolutions thereof; Fig. 5 is a cross-sectional view through one of the end fittings of the tube as on substantially the plane of line 5—5, Fig. 1. Fig. 6 is a broken and part sectional view of one end of the tubing illustrating a modification.

In the particular embodiments here shown, the tube is made up of a helically coiled strip of sheet metal or the like, bent or shaped transversely to form a relatively wide concavo-convexly curved part 7 connected by an outwardly extending rib 8 with an undercut and inwardly dished curved wall 9, opposite the portion 7 and merging into a relatively flat guiding portion 10 of lesser diameter, having an outwardly extending flaring flange 11. The edge of this flange is indicated as rounded at 12 to form a bearing slidingly engaging the inner convex surface of the larger wall 7 of the next adjacent coil and similarly the opposite edge 13 of the strip is shown as rounded to form a bearing to slide freely over the dished and inwardly concavely curved surface of the intermediate web portion 9 of the adjoining helix.

The concave curvature (to the center of the tube) of the larger portion 7 is sufficient by engagement over the flange 11 to interlock the coils together and to preserve a bias tending to hold the rounded edges 13 against the concave curvature of the intermediate webs 9.

The outwardly buckled intermediate rib adds a degree of reinforcement and provides a flange or stop shoulder positively preventing one convolution from collapsing over the other.

The arc of curvature of the larger diameter portion 7 is indicated as formed on a radius R, Fig. 3 struck from approximately the center line of the tube and having a chord C substantially parallel with the axis of the tube. The web portion 9 is shown as dished on a concave curvature having a radius R' struck from the axial center at a point some distance ahead of the coil, this producing a relatively shallow cup form, permitting the convolutions to slide one into the other at the inside of the curve in the tubing as indicated in Fig. 4, "condensing" the tubing at the inside of the circle and thus compensating so as to prevent any increase in effective length. As the bearing edges 13 slide inwardly over the dished surfaces at 9 at the inside of the bend the similar edges 13 at the outside of the bend can slide outwardly over the outer portions of the dished surfaces, the coils in effect swivelling over the bearing edges 12 at this time and the ribs 8 preventing any collapsing action of one convolution over the other.

In either the curved or straight relation, the extended surfaces of the smaller diameter portions 10 form a smooth guide for the brake cable 14 as plainly shown in Figs. 3 and 4.

If additional reinforcement or guiding of the cable between adjacent convolutions is desired or required, a relatively closely coiled spring 15 may be disposed within the shaped tubing as shown in Fig. 6, the cable then sliding directly through this inner coiled spring.

In the detailed view, Fig. 6, the inner coiled spring 15 is indicated as secured at each end to a washer or plate 16 seated against a shoulder 17 in the sleeve 18 forming the end fitting and anchorage by which the tube is secured in its operative relation. These end sleeves 18 may be fastened on the ends of the tubing as indicated in Figs. 5 and 6 by forcing them over slips 19 in the form of segments shaped to or cast about the ends of the tubing and then turning in flanges 20 over the inner edges of these slips as indicated in Fig. 6. To overcome any twisting tendency of these end fittings, the slips or fillers 19 may be keyed to the tubing by providing them with ribs or keys 21 entering in slots 22 cut or otherwise formed in the ribs 8 of the tubing.

The tube strip is of such a shape that it can be formed in cross-section and wound up in tubular shape all on the one machine and as part of the same continuing operation. The coiled tubing thus produced can then be cut off in proper lengths and the end fittings or anchorages applied as described.

The operating tube constructed as disclosed is strong and durable, but has sufficient flexibility for front wheel brake purposes and because of the rolling or sliding compensating action described, maintains a substantially constant axial length, thus forming a proper guide for the brake cable without introducing undesirable changes in the length of the cable.

The dished or concaved end faces of the coils in addition to affording the necessary compensation to keep the axial length of the tubing practically constant also serve as substantial abutment shoulders, serving under engagement of the bearing edges 13 thereagainst, to prevent any collapsing movement of the coils under the stress of the brake cable, which, particularly in the bending of the tube may apply a considerable "collapsing" force over the arched inner surface of the tube. This arch by reason of this construction becomes practically rigid and yet may freely bend as required by the turning of the steering wheels. It will be apparent that the edges 12 and 13 normally abut against the concave face of portion 7 and the curved surface 9, respectively. That is to say, they effect a closed tube under normal conditions of use. In view of the broad scope of the invention, it should be understood that the terms employed herein are used in a descriptive rather than in a limiting sense except possibly as limitations may be imparted to the intent of the claims by the state of the art.

What is claimed is:

1. A flexible brake operating tube of substantially constant axial length, comprising a spirally interlocked strip of preformed transverse shape having edge portions of greater and lesser diameters connected by an inwardly dished web and an outwardly extending rib of greater diameter than the larger diameter portion of the strip and the portion of lesser diameter having an outwardly extending edge flange forming by engagement inside the larger diameter portion of an adjoining coil, a sliding interlocking connection between adjacent convolutions of the two.

2. A flexible tube of substantially constant axial length, for carrying a cable slidable therewithin, comprising a spirally interlocked strip of preformed transverse shape having edge portions of greater and lesser diameters connected by an inwardly dished web and an outwardly extending rib of greater diameter than the larger diameter portion of the strip and the portion of lesser diameter having an outwardly extending edge flange forming by engagement inside the larger diameter portion of an adjoining coil, a sliding interlocking connection between adjacent convolutions of the two, the portions of lesser diameter having extended internal smooth bearing surfaces, and end fittings interlocked with the tubing to provide anchorages for the same, said end fittings having passages for the cable.

3. A flexible brake operating tube of substantially constant axial length, comprising a spirally interlocked strip of preformed transverse shape having edge portions of greater and lesser diameters connected by an inwardly dished web and an outwardly extending rib of greater diameter than the larger diameter portion of the strip and the portion of lesser diameter having an outwardly extending edge flange forming by engagement inside the larger diameter portion of an adjoining coil a sliding interlocking connection between adjacent convolutions of the two, the inside faces of the larger diameter portions of the strip being concavely curved on an arc having a chord substantially parallel with the axis of the tube and the dished web portion of the strip being concavely curved and providing bearing surfaces for the edges of the larger diameter portions of adjoining convolutions.

4. A flexible brake operating tube of substantially constant axial length, comprising a spirally interlocked strip of preformed transverse shape having edge portions of greater and lesser diameters connected by an inwardly dished web and an outwardly extending rib of greater diameter than the larger diameter portion of the strip and the portion of lesser diameter having an outwardly extending edge flange forming by engagement inside the larger diameter portion of an adjoining coil, a sliding interlocking connection between adjacent convolutions of the two, and a closely coiled cable guiding spring within the tube for guiding a cable therein.

5. In a four-wheel brake construction, a transversely shaped strip coiled in helically interlocked formation and having in said formation edge portions of different diameters connected by a dished web, the edge portion of greater diameter being concavely curved inside the tube and the portion of lesser diameter having a flaring edge flange, the concavely curved part of one convolution having a sliding bearing over the edge of the flaring flange on an adjoining convolution, said lesser diameter edge portions having broad bearing surfaces inside the tube.

6. In a four-wheel brake construction, a transversely shaped strip coiled in helically interlocked formation and having in said formation edge portions of different diameters connected by a dished web, the edge portion of greater diameter being concavely curved inside the tube and the portion of lesser diameter having a flaring edge flange, the concavely curved part of one convolution having a sliding bearing over the edge of the flaring flange on an adjoining convolution, said lesser diameter edge portions having broad bearing surfaces inside the tube, the edge of the larger portion of the strip of one convolution having a sliding bearing against the dished web portion of an adjoining convolution.

7. A flexible tube of the character disclosed, comprising a helically coiled strip having endwise facing concavely dished shoulders in abutment, respectively, with portions of adjoining convolutions of the helically coiled strip, said strip having broad bearing surfaces inside the helices.

In testimony whereof I affix my signature.

EDWARD J. MADDEN.